Figure 4:
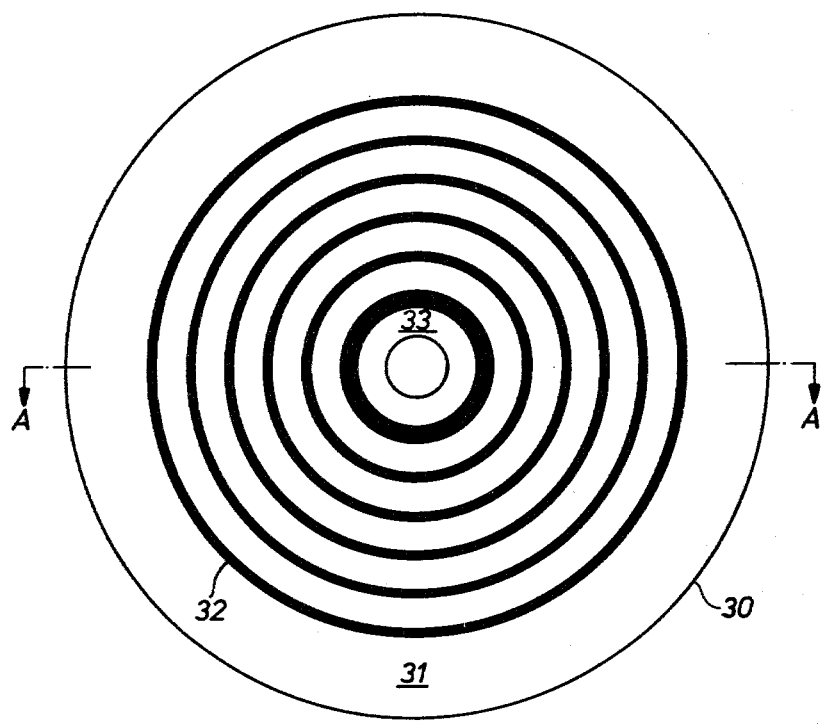

United States Patent [19]

Jonak

[11] 4,208,031
[45] Jun. 17, 1980

[54] CONTROL VALVE

[75] Inventor: Vladimir Jonak, Tumba, Sweden

[73] Assignee: Alfa-Laval AB, Tumba, Sweden

[21] Appl. No.: 907,060

[22] Filed: May 17, 1978

[30] Foreign Application Priority Data

May 20, 1977 [SE] Sweden .............................. 7705951

[51] Int. Cl.² .......................................... F16K 31/145
[52] U.S. Cl. ..................... 251/61.2; 92/97;
92/103 F
[58] Field of Search .................. 251/61.2; 92/97, 105, 92/103 F; 91/369 B

[56] References Cited

U.S. PATENT DOCUMENTS

| | | | |
|---|---|---|---|
| 1,461,086 | 7/1923 | Fesler | 92/97 |
| 2,501,957 | 3/1950 | Moore | 92/103 F X |
| 2,602,467 | 7/1952 | Griswold | 251/61.2 |
| 2,953,152 | 9/1960 | Allen | 137/505 X |
| 3,982,558 | 9/1976 | Ochs | 137/455 |

FOREIGN PATENT DOCUMENTS

| | | | |
|---|---|---|---|
| 11225 | of 1900 | United Kingdom | 137/505.34 |
| 304105 | 1/1929 | United Kingdom | 92/97 |

Primary Examiner—Harold W. Weakley
Attorney, Agent, or Firm—Cyrus S. Hapgood

[57] ABSTRACT

A flexible membrane wall divides a control valve housing into two chambers, one for a control fluid and one for a fluid to be processed, the latter chamber containing a valve seat coacting with a valve body secured to the central part of the membrane wall. This wall comprises two membrane members facing said chambers, respectively, and separated by a plurality of stiff supporting elements which are movable relative to each other. Each supporting element is pivotally connected at one end to the valve housing and at the other end to the valve body, whereby axial loads on the membrane members are transferred through the support elements to the housing and valve body.

4 Claims, 5 Drawing Figures

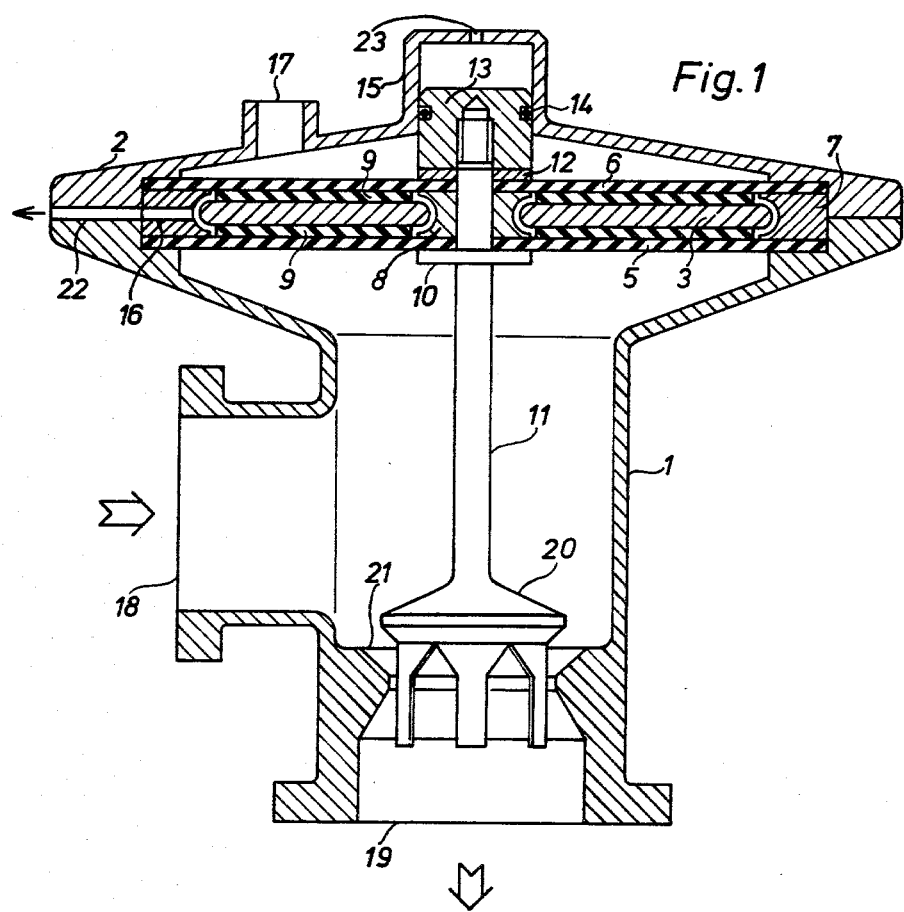
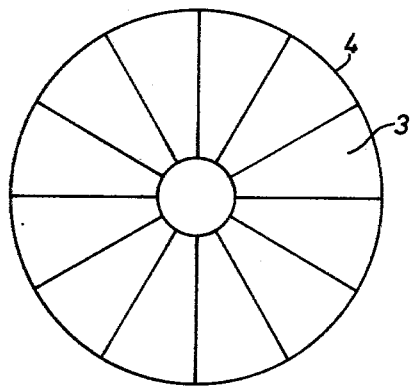
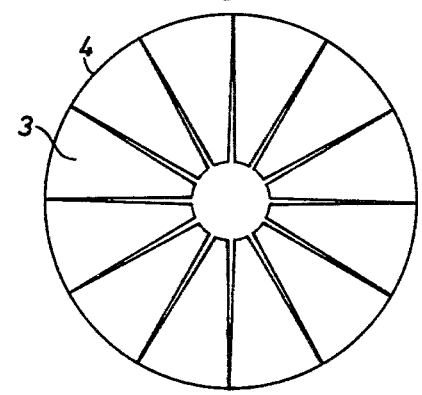

U.S. Patent Jun. 17, 1980 Sheet 2 of 2 4,208,031

CONTROL VALVE

The present invention relates to a control valve of the type having its movable valve body suspended in a membrane wall which is sealingly clamped in the valve housing so as to separate two spaces which are subjected to different pressures during the use of the valve.

In valves of this kind, the design of the above-mentioned membrane wall is a problem. For different reasons, this membrane wall must often have an essentially larger diameter than the part of the movable valve body which is fixed to the membrane wall. This makes it difficult to achieve high control accuracy with such a valve. More particularly, the problem is that the membrane wall must have the two different characteristics of mechanical strength and flexible response to relatively small pressure variations between said two spaces on each side of the membrane wall.

An additional problem arises if the membrane wall is to be in contact with a process fluid which requires an hygienic design of the membrane wall and the entire control valve. This means that the process fluid side of the valve must not exhibit any spaces which are hardly accessible for a cleaning fluid. Further, there must be practically no risk for leakage of process or control fluid through those parts of the membrane wall where it is attached to the valve housing and the valve body, especially if the control valve is to be used within the food stuff industry.

In a known pressure control valve, the membrane wall consists of a single relatively thick membrane, the central part of which supports a movable valve body comprising a member arranged to open and close a passage through a valve seat. Despite efforts to provide special membrane material having good strength characteristics and the use of a relatively thick membrane, which has become remarkably expensive, these efforts have not yet resulted in a control valve which can be used for a long period of time without any risk of membrane fatigue breaks. Another unsatisfactory feature of this known valve is an insufficient damping of the movements of the membrane with large changes in the flow through the valve, causing the membrane to "flutter", which further contributes to reducing the operational life due to fatigue breaks.

From the hygienic point of view, the known valve is far from satisfactory. In order to avoid a membrane breakdown even after a very short time of operation, the valve housing wall must leave the membrane from its clamping contact with the same at a very small angle to be able, at certain pressure conditions, to support a considerable part of the membrane. The narrow pockets thus formed between the membrane and the valve wall are extremely difficult to reach with cleaning fluids.

According to the present invention, a control valve is provided which does not have the shortcomings mentioned above. The control valve according to the invention, having a simple design as well as a reliable performance, is primarily characterized in that the membrane wall includes two separate membranes, one on each side of said wall facing the corresponding one of said chambers, and a number of stiff support elements, which are free or readily flexible relative to each other, are arranged between said membranes with one end pivotally connected to the valve housing and the opposite end pivotally connected to the valve body so that axial loads on the membranes will be transferred through the support elements to the housing and the valve body.

According to a preferred embodiment of the invention, a particularly simple and safe-operating control valve is obtained when the support elements in the space between the two membranes are freely inserted between grooves at the periphery of the valve housing and grooves in the movable valve body. In this way, the support elements, being freely inserted between said grooves without any fixing means, are completely locked with respect to the surrounding membranes, since the outer and inner ends of the support elements cannot leave the grooves at the periphery and the center of the membrane wall, respectively.

For every position assumed by the membrane wall, the two membranes will rest upon the support surfaces which all the stiff support elements form together. Thus, the two membranes are effectively unloaded, and the valve can be maintained in operation for a long period of time without any risk of membrane breakdown, even if thin, inexpensive membranes are used. The invention has provided a membrane wall which practically cannot be damaged through deformation but nevertheless has a central part in which the movable valve body is suspended, the membrane wall being easily flexible in the movement direction of the valve body so as to exactly and rapidly assume its position in accordance with prevailing pressures on the two sides of the membrane wall.

Since the deforming loads on the membranes are strongly reduced by means of the support elements, only a small peripheral part of each membrane is required for their clamping between two parts of the valve housing. Due to the invention, there is no need for using parts of the valve housing wall to support any bulging part of the membrane wall. Thus, any angle between the membrane and the housing wall at the periphery of the membrane can be allowed, and the substantially inaccessible pockets mentioned above can be eliminated. The fact that the membrane wall according to the invention includes double membranes providing a further advantage from the safety and hygienic point of view, since upon any breakdown of the membrane wall, leakage occurs only to the interspace between the membranes, provided that one of the membranes fails before the other. A draining channel may be arranged from the interspace between the membranes, said draining channel possibly being connected to a leakage indicator.

In a preferred embodiment of the control valve according to the invention, each support element has the form of a tip-truncated circle sector, the support elements being so arranged that, when located in one and the same plane, they form a circular or annular disc. The support elements are preferably freely inserted into grooves in the membrane wall periphery and in the movable valve body, respectively.

The present invention is especially suitable for use in so-called directly operating pressure control valves, primarily constant-pressure-valves. By applying the invention to valves of the last-mentioned type, excellent results have already been obtained. In such valves, the purpose of which is to keep constant the pressure of a process fluid at varying flow through the valve, one side of the membrane wall is subjected to the pressure of the process fluid in question, whereas the other side of the membrane wall is subjected to the pressure of a control fluid. The control fluid can consist of a gaseous fluid or a liquid fluid.

The invention can also be used in other kinds of valves, for example, in constant-flow-valves.

Figure 5:
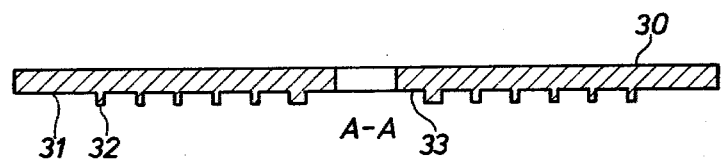

An embodiment of the invention will now be described in detail, by way of example, with reference to the accompanying drawings in which FIG. 1 is a cross-sectional view through a preferred embodiment of a pressure control valve, FIG. 2 is a plan view of a preferred embodiment of the support elements and the support surface formed by them when in one plane, FIG. 3 is a plan view of the same support surface in a bulging position, FIG. 4 is a plan view of a preferred membrane design, and FIG. 5 is a cross-sectional view of the membrane taken on line A—A in FIG. 4.

In the embodiment according to FIG. 1, the membrane wall is clamped between a valve housing 1, having an inlet 18 and an outlet 19 for a process fluid, and a valve housing cover 2 having an opening 17 for a control fluid. The membrane wall is shown in the planar position that corresponds to a medium position for the movable valve body 11, 20 suspended therein. The membrane wall includes an upper membrane 6 to be in contact with the control fluid, a lower membrane 5 to be in contact with the process fluid, a number of support elements 3 (the supporting surface 4 of which is best shown in FIG. 2) and two annular, elastic spacer elements 9 which fill up the interspaces between the support elements and the membranes 5 and 6, respectively. These interspaces are formed due to the clamping of the membranes 5 and 6 against each of the sides of an outer ring 7 located between the valve housing 1 and the cover 2, as well as against each of the sides of an inner ring 8 located between the cover 2 and a projection 10 of the valve body shaft 11. A washer 12 engages the upper surface of upper membrane 6 and surrounds shaft 11. For draining and possible indicating of any leakage into the space between the membranes 5 and 6, there is a channel 16 in the outer ring 7, said channel being in line with a corresponding channel 22 provided at the joint between the valve housing 1 and the cover 2.

The movable valve body includes a member 20 which cooperates with a valve seat 21 and is arranged to open and close the connection between the inlet 18 and the outlet 19. The member 20 and the seat 21 also serve as a guide for the movable valve body. At the upper side of the membrane wall another guide is provided for the valve body, said guide consisting of a piston 13 screwed onto the valve body shaft 11 to cooperate with a cylinder 15 formed in the cover 2. A sealing ring 14 serves for sealing between the piston and the cylinder, and in the top of the cylinder is an air channel 23. By appropriate dimensioning of this air channel 23, a certain damping of the movement of the membrane wall can be obtained. The piston 13 and the adjacent washer 12 are also used for fixing the membranes 5 and 6 and the inner ring 8 against the projection 10 of the valve body shaft 11.

The design of the support elements 3 and the support surface 4 formed by them are best shown in FIG. 2 and FIG. 3. As there shown, each support element 3 provides a support surface having the form of a tip-truncated circle sector. For manufacturing as well as operative reasons, each support element has a uniform thickness.

As shown in FIG. 2, the support elements 3 lie in a single common plane so that their adjacent edges are close to each other. As shown in FIG. 3, there is a space between adjacent support elements which gradually widens radially inward, these relative positions being taken by the support elements when the membrane wall has attained a bulging position, that is, when the valve body 11, 20 has been moved upwards or downwards with respect to the position shown in FIG. 1. It is to be noted that the upper extreme position of the valve body is determined by the contact between piston 13 and the top of the cylinder 15, whereas the extreme lower position is determined by the contact between member 20 and the seat 21 when the outlet 19 is completely closed. Since they cannot leave the two grooves in the rings 7 and 8, respectively, the support elements 3 in any position of the valve body 11, 20 will form a stiff, flat or slightly conical support surface for the membrane in a support system which works practically independently with respect to the membranes 5 and 6. To enable the sector-formed support elements to freely pivot in the grooves of the two rings, the edges at the inner and outer ends of the support elements are preferably rounded off.

The preferred embodiment of the invention described above provides a safely operating control valve in that all the loads which could deform and damage the membranes are transferred by the support elements 3 to the valve housing and the valve body. The advantages from the hygienic and the leakage safety points of view have already been described. Finally, it should be noted that the control valve shown in FIG. 1 has been tested for a long period of time during which it has operated very satisfactorily as a constant-pressure-valve in a flow system with great variations in the amount of fluid passing through it. The results appear to be still more satisfactory when the very simple valve design is taken into consideration.

The spacer elements 9, placed between the membranes 5–6 and the support elements 3, are preferably made of an elastic material to cooperate with the other parts of the membrane wall to form a combined damping system. Alternatively and preferably, membranes having projections on one of their sides can be mounted in direct contact with the support elements through said projections.

Such a preferred membrane design is shown in FIGS. 4 and 5. The membrane 30 has on one side an outer annular plane surface 31 and an inner annular plane surface 33 to be clamped against the above-mentioned outer and inner rings 7 and 8, respectively. Between the surfaces 31 and 33, the membrane has on this same side a number of thin ridges 32 concentrically arranged with respect to each other. This membrane design provides several advantages. Since a certain elastic extension of the membrane is required as the support surface increases when it moves from a planar position to a bulging position, there is a risk that the elastic deformation of the membranes will be concentrated at the center and periphery of the membrane, where it is clamped. The ridges 32, however, through sliding or possibly bending against the support elements, provide a uniform distribution of the elastic deformation over the membrane. Further, the membrane is reinforced by the ridges without losing its flexibility. Finally, the friction due to the interaction between the ridges and the support surface contributes to provide good damping characteristics to the moving system of the valve.

It will be understood that when the two membranes are constructed as shown in FIGS. 4 and 5, the ridges 32 of each membrane will replace the spacer elements 9 in FIG. 1.

The stiff support elements 3 can be manufactured of any sufficiently stiff material. Thus, metallic material such as brass, bronze or stainless steel can be used, but also stiff plastic materials, especially plastics comprising reinforcing fibers such as glass fibers. If sector-formed support elements are selected, it should be noted that a small clearance between each separate element is needed even when the support elements are located in one and the same plane.

The membranes can be made of any flexible material. An interesting type of membrane, which in addition to the sealing function also could contribute to the damping of the membrane wall, is a membrane of folded plate, suitably stainless plate. The membrane is then designed to have a planar peripheral part and a folded central part, the folding being adapted to the desired deflection in operation. If the process fluid to be passed through the control valve is of especially corrosive nature, the membrane being in contact with the process fluid can be coated with a protective coating, such as a teflon coating.

In addition to its other advantages, the new valve lends itself to a very easy disassembling, as for inspection or membrane replacement. First, the cover 2 is detached from the valve housing 1, as by loosening an annular clamping means which clamps together flanges of the cover 2 and the valve housing 1 and simultaneously clamps the membranes 5 and 6 against each side of the outer ring 7. Then it only remains to unscrew the piston 13 so that the various parts in the valve housing can be detached from each other. The support elements 3 can be removed easily, since the relative motion between the two rings 7 and 8 is no longer restricted in the axial direction.

I claim:

1. A control valve comprising a valve housing, a membrane wall sealingly clamped in said housing and forming therewith two separate chambers adapted to be subjected to different pressures, respectively, the housing having a valve seat in one of said chambers, and a valve body coacting with said seat and secured to the central portion of the membrane wall to follow movements of said wall axially thereof, the membrane wall including two separate membrane members, one on each side of said wall facing a corresponding one of said chambers, and a plurality of stiff support elements located between said membrane members, said support elements being movable relative to each other and each having one end pivotally connected to the valve housing and the opposite end pivotally connected to the valve body, whereby axial loads on the membrane members are transferred through the support elements to said housing and valve body, the control valve being characterized in that each support element has the general form of a circle sector, said sector elements, when in a common plane, coacting with each other to form a generally continuous planar circular support disc supporting the membrane members across substantially their entire surfaces, said support disc being axially flexible into a slightly conical form in which the radially inner portions of the sector elements have a greater spacing from each other than when in said common plane.

2. The valve of claim 1, in which each membrane member has projections on one side thereof distributed across the membrane surface and through which the membrane member makes direct contact with the support elements.

3. The valve of claim 2, in which said projections are thin circular ridges.

4. The valve of claim 1, in which the membrane wall also includes inner and outer concentric rings each forming an annular groove, said sector elements having radially inner and outer edges which are rounded and which are received and movable in the annular grooves of said inner and outer rings, respectively, said membrane members being clamped against said rings.

* * * * *